United States Patent [19]

Chandhoke

[11] 4,424,966
[45] Jan. 10, 1984

[54] MECHANISM FOR CONVEYING ARTICLES SELECTIVELY INTO DIFFERENT PATHS

[75] Inventor: Mohanjit S. Chandhoke, Plattsburgh, N.Y.

[73] Assignee: Harris Graphics Corporation, Melbourne, Fla.

[21] Appl. No.: 298,933

[22] Filed: Sep. 3, 1981

[51] Int. Cl.³ ............... B65H 29/60; B65G 37/00
[52] U.S. Cl. ............................. 271/302; 271/182; 271/189; 198/369
[58] Field of Search ............... 271/84, 182, 183, 202, 271/203, 256, 267, 302, 303, 189, 191; 198/369, 437

[56] References Cited

U.S. PATENT DOCUMENTS

| | | | |
|---|---|---|---|
| 2,392,032 | 1/1946 | Gray | 271/69 |
| 2,802,560 | 8/1957 | Sramek | 198/31 |
| 3,373,666 | 3/1968 | Crampton | 271/256 |
| 3,643,939 | 2/1972 | Nussbaum | 271/3.1 |
| 4,034,974 | 7/1977 | Maopolski | 270/55 |

FOREIGN PATENT DOCUMENTS 724901  7/1942  Fed. Rep. of Germany ...... 271/302
2820877 12/1978  Fed. Rep. of Germany ...... 271/302

Primary Examiner—Robert B. Reeves
Assistant Examiner—Donald Hajec
Attorney, Agent, or Firm—Yount & Tarolli

[57] ABSTRACT

There is disclosed a gate mechanism including a conveyor for conveying a shingled stream of articles along either of two paths and for shifting between the two paths without interruption of the flow of articles. The mechanism includes an infeed conveyor having an end portion pivotable between a generally horizontal position in which it is aligned with one outfed conveyor and a downwardly inclined position in which it is aligned with a second outfeed conveyor. Prior to returning from the inclined position to the horizontal position a pivotable rake which includes a number of V-shaped members swings to clear the inclined portion of any articles and to temporarily support articles arriving on the infeed conveyor.

7 Claims, 5 Drawing Figures

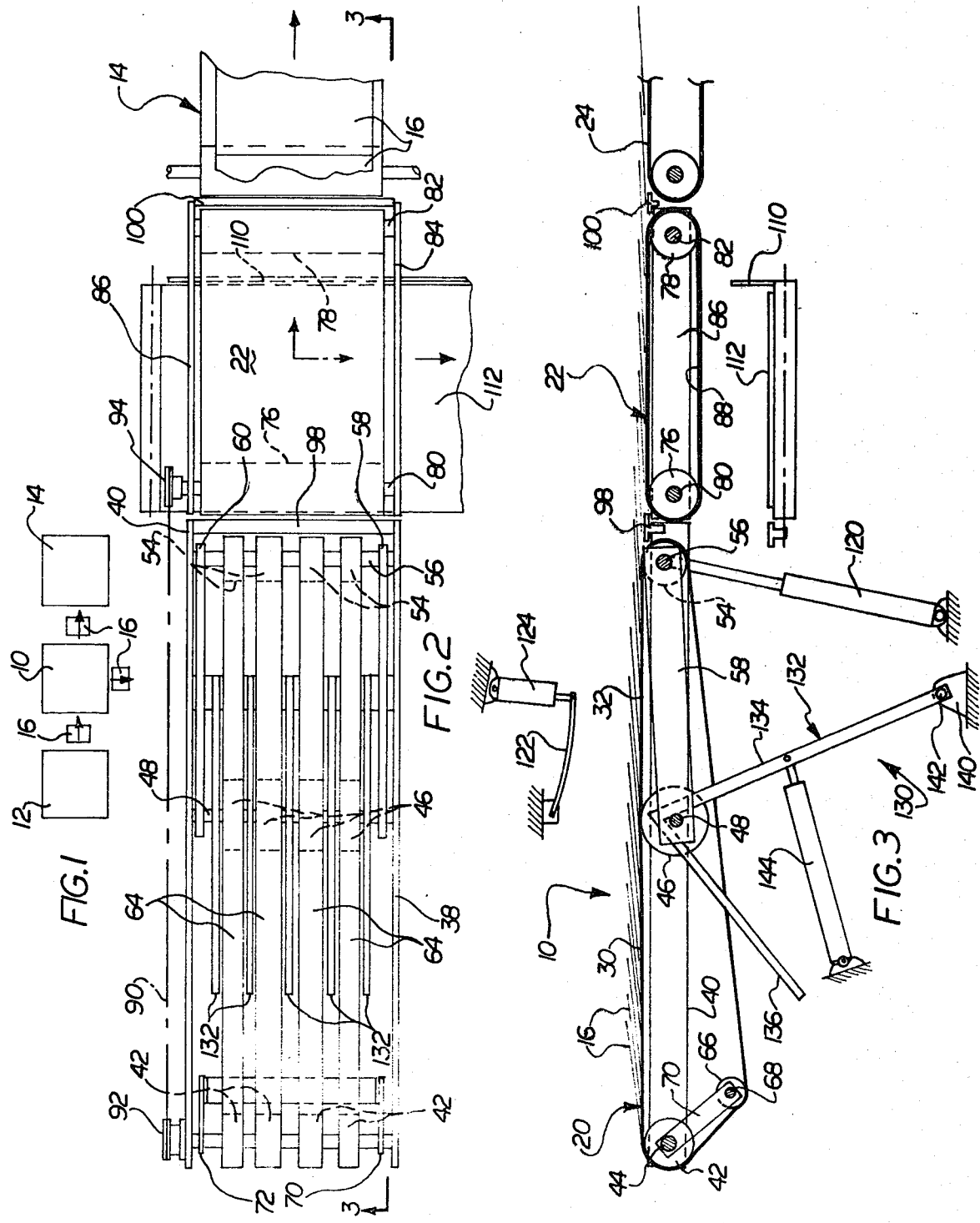

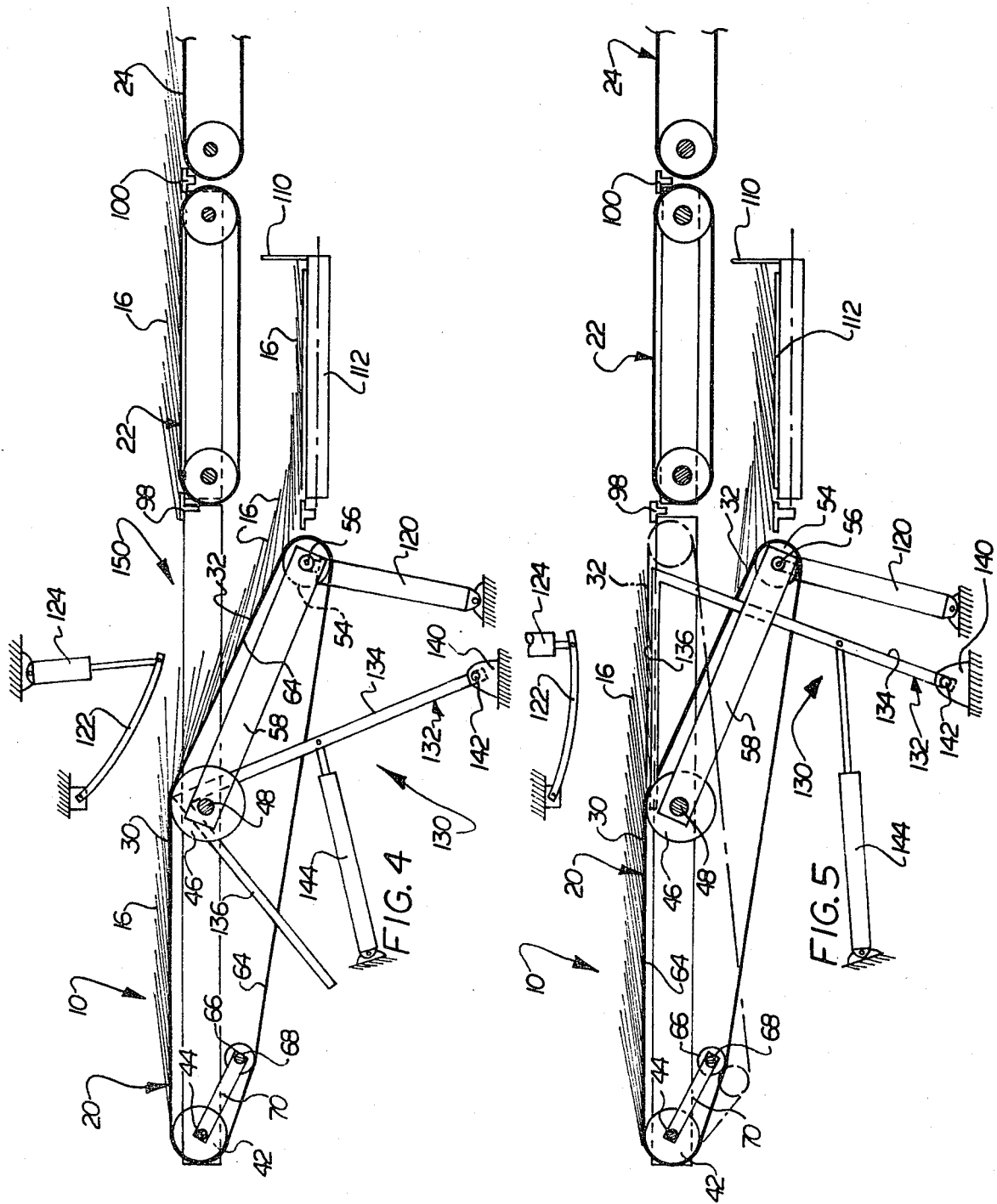

MECHANISM FOR CONVEYING ARTICLES SELECTIVELY INTO DIFFERENT PATHS

BACKGROUND OF THE INVENTION

The present invention relates to a gate mechanism for directing a shingled stream of articles, such as books, newspapers, or signatures, in one of a plurality of paths.

Typically, gate mechanisms are interposed between article-handling mechanisms which operate in sequence on a shingled stream of articles, such as between a printing press and collator or between a binder and stacker. Such gate mechanisms normally direct articles in a primary path between the article-handling mechanisms. However, in the event that the downstream article-handling mechanism is overloaded or malfunctions, the gate mechanism operates to direct the articles in a secondary path which may be, for example, to an overflow area or to another downstream article-handling mechanism. As a result, the upstream article-handling mechanism can keep operating, even though a downstream article-handling mechanism is inoperative. Normally, the gate mechanism re-establishes the shingled stream flow in the primary path to the downstream article-handling mechanism after the overload or malfunction has been corrected.

One known gate mechanism is shown in U.S. Pat. No. 4,034,974. This patent discloses a gate which moves to direct a shingled stream of articles in one of two different paths. In the system disclosed in U.S. Pat. No. 4,034,974, a gapmaker provides a gap in the shingled stream. The gate is moved when the gap is adjacent the gate. Thus, the gate does not disturb any of the articles in the shingled stream. The gate mechanisms shown in other patents, such as U.S. Pat. No. 2,392,032, direct articles which are spaced apart rather than in a shingled stream. In such mechanisms, the gate is normally moved during the time interval when the gate is adjacent a space between the articles. Otherwise, the articles would be disturbed by movement of the gate.

SUMMARY OF THE PRESENT INVENTION

The present invention comprises a gate mechanism which is adapted to be interposed between sequential article-handling mechanisms. The gate mechanism is of the type which includes a movable member for directing articles in one of a plurality of paths. The gate mechanism is constructed in a manner that allows the gate member to be moved, even though there is no gap in the stream of articles. The movement of the gate member occurs without disturbing the stream of articles, even though the stream of articles is a shingled stream.

Specifically, the present invention comprises a gate mechanism which includes a conveyor which is movable between two positions. In a first position, the conveyor directs a shingled stream of articles along a first path, and in a second position, the conveyor directs the shingled stream of articles in a second path. The conveyor means from the second position back to the first position to re-establish the shingled stream of articles in the first path. The gate mechanism further includes a rake having a first part for pushing the articles off the conveyor prior to return of the conveyor from its second position to its first position re-establishing the shingled stream of articles in the first path. The rake also includes a second part for supporting and directing the articles in the first path while the articles are being pushed off the conveyor element by the first part.

Specifically, the rake includes a plurality of V-shaped members disposed side by side. One leg portion of each V-shaped member engages the articles on the conveyor to push the articles off the conveyor, and the other leg portion of each V-shaped member extends at an angle to the first leg and supports and directs the articles in the first path while the articles are being pushed off the conveyor.

BRIEF DESCRIPTION OF THE DRAWINGS

Further features of the invention will be apparent to those skilled in the art from the following description of a preferred embodiment of the invention made with reference to the accompanying drawings in which:

FIG. 1 is a schematic view of a system including the present invention;

FIG. 2 is a top plan view of a mechanism embodying the present invention and incorporated in the system of FIG. 1;

FIG. 3 is a schematic side elevation view of the mechanism of FIG. 2 with parts directing a shingled article along a primary path;

FIG. 4 is a schematic side elevation view similar to FIG. 3, but with parts diverting the articles from the primary path into a secondary path; and FIG. 5 is a schematic side elevation view of the apparatus of FIG. 2 with the parts in still another position;

DETAILED DESCRIPTION OF PREFERRED EMBODIMENT

The present invention relates to a gate mechanism 10 (FIG. 1) to be located between sequential article-handling mechanisms 12 and 14. The article-handling mechanisms may be a book binder 12 and a stacker 14, although the gate mechanism 10 may also be placed between other article-handling mechanisms. The gate mechanism 10 directs books 16 along a primary path from the binder 12 to the stacker 14. The books 16 are in a shingled stream, i.e., each book is lapped by the subsequent book. Although the present invention is described with respect to a shingled stream of books 16, it is equally applicable to shingled streams of other types of articles, such as signatures or any other sheetlike articles.

The gate mechanism 10 is shiftable to divert books 16 along a secondary path and away from the stacker 14 in the event of a malfunction or overload in the stacker. The gate mechanism 10 (FIG. 3) includes conveyors 20 and 22 which convey the shingled stream of books 16 to a conveyor 24 which is a part of the stacker 14. Conveyor 20 has a infeed conveyor part 30 and a pivotable conveyor end portion 32. When the gate mechanism 10 is shifted to direct books 16 along the primary path, the end portion 32 of the conveyor 20 is aligned with the conveyor 22.

Conveyor 20 has two parallel, rigid, side frame members 38 and 40. Pulleys 42 are mounted on a cross shaft 44 and pulleys 46 are mounted on a cross shaft 48. The cross shafts 46 and 48 are rotatably supported between the frame members 40 and 38. In addition, conveyor belt pulleys 54 are rotatably mounted on cross shaft 56. The opposite ends of cross shaft 56 are secured to the distal ends of two parallel pivot frame arms 58 and 60. The ends of the frame arms 58 and 60 remote from the shaft 56 are pivotably mounted on cross shaft 48 and permit the pulleys 54 and the end portion 32 of the conveyor 20 to pivot up or down as a unit.

A plurality of a laterally spaced apart conveyor belts 64 (FIG. 2) are supported by pulleys 42, 44, and 54. Conveyor belts 64 are suitably tensioned by idler pulleys 66. The pulleys 66 are mounted on cross shaft 68 which is secured at opposite ends to two parallel pivot members 70 and 72 which are in turn pivotally secured at their upper ends to shaft 44. Gravity or a suitable spring biases the pulleys 66 downward to tension the belts 64.

Conveyor 22 includes pulleys 76 and 78 which are rotatably supported on shafts 80 and 82, respectively, between rigid frame members 84 and 86. A belt 88 is trained over the pulleys 76 and 78.

A common conveyor drive belt 90 (FIG. 2) drives conveyor belts 64 and 88 at the same speed. The drive belt 90 is driven by a prime mover (not shown) and drives a pulley 92 fixed to shaft 44 and a pulley 94 fixed to shaft 80.

Stationary, T-shaped bridging members 98 and 100 extend between frame members 38 and 40 of conveyor 20 and between frame members 84 and 86 of conveyor 22. The bridging members 98 and 100 support articles 12 between the conveyors 20 and 22 and between conveyors 22 and the stacker conveyor 14.

As noted above, the conveyor end portion 32 is pivotable between two positions. In one position, as shown in FIG. 3, the conveyor end portion 32 is in horizontal alignment with conveyor 22 and directs the books 16 along a primary path to the stacker 14. The conveyor end portion 32 is pivoted downward to an inclined, second position (FIG. 4), to direct the books 16 to the conveyor 112 in the event of a malfunction or overload in the stacker 14. In the second position, shown in FIG. 4, the books 16 are directed along the secondary path of travel downward on the inclined conveyor end portion 32. Thus, by shifting the conveyor end section 32 from its upper horizontal position to its lower, inclined position, the binder 12 can continue to operate with the signatures being directed away from the stacker 14.

The conveyor end portion 32 is pivoted between its two positions by a suitable air cylinder 120 which has a piston attached to the arms 58 and 60. When the conveyor end portion 32 is pivoted to its lower, inclined position (FIG. 4) a guide or deflector 122 is also moved downwardly by an air cylinder 124 to assist in directing the shingled stream of books down the inclined conveyor portion 32. The books 16 are directed from the inclined conveyor section 32 against the backstop 110 and then they are conveyed laterally away from the conveyor end portion 32 by the conveyor 112. When the malfunction or overload in the stacker 14 is corrected, the stream of books 16 is re-established in the primary path to the stacker 14. This is accomplished by extending the cylinder 120 to move the conveyor end portion 32 from the inclined position shown in FIG. 4 to the horizontal position shown in FIG. 3.

In accordance with the present and as shown in FIG. 5, a rake 130 is provided for supporting the stream of articles in the primary path while the conveyor and portion 32 is being moved back to its upper, horizontal position (FIG. 3) in which it established the flow of books 16 in the primary path. Also, the rake 130 pushes the books 16 that are on the conveyor end portion 32 while in its inclined, lower position off the conveyor end portion 32 while simultaneously supporting the incoming stream of articles in the primary path. As a result, the end portion 32 of the conveyor 20 can move back to its original, upper, horizontal position, re-establishing the primary flow of books 16 from the binder 12 to the stacker 14 with a minimum of disruption of the shingled stream of books.

The rake 130 includes a plurality of laterally spaced, V-shaped members 132 positioned in a side-by-side arrangement so that they form the tines of the rake. One leg 134 of each of the V-shaped members 132 serves as a book pusher, and the other leg 136 of each V-shaped member 132 serves as a bridge. All of the V-shaped members 132 are secured to a common pivot block 140 and pivot as a single unit about axis 142. The V-shaped members 132 are spaced along the axis 142 so that they are movable in the spaces between the conveyor belts 64 of the conveyor 20 as best shown in FIG. 2. An air pressure actuated piston and cylinder unit 144 is connected with the V-shaped members 132 and upon actuation moves the members 132 between a retracted position illustrated in FIGS. 3 and 4 and an extended position illustrated in FIG. 5.

During normal operating conditions as shown in FIG. 3, the shingled stream of articles move from left to right along the primary path across the conveyors 20, 22 and 24. The conveyor end portion 32 is in its upper, horizontal position, the rake 130 is in its retracted position shown in FIG. 4, and the article guide 122 is in a raised position shown in FIG. 3.

When a jam up occurs in a stacker 14, the air cylinder 120 retracts so that the conveyor end portion 32 is pivoted downwardly to its second, inclined position shown in FIG. 4. Simultaneously, the guide 122 is moved downwardly by air cylinder 124 to help deflect articles from the primary path to the secondary path. The books 14 are then directed along the secondary path to the conveyor belt 112 which laterally conveys the books away from the conveyor end portion 32.

When the stacker 14 is again ready to receive books, the air cylinder 124 is retracted so that the deflector 122 is raised to its upper position shown in FIG. 5. The air cylinder unit 144 is then extended to pivot the rake 130 clockwise to its extended position as shown in FIG. 5. As the V-shaped members 134 rotate about axis 142, the leading edges 134 push the books from conveyor portion 32 onto the conveyor 112, thereby clearing the books off the conveyor portion 32. This assures that no article will remain on conveyor end portion 32 during the upward return movement of the conveyor end portion from its inclined position (FIG. 5) to its horizontal position (FIG. 3). Therefore, there is no risk of having an article become jammed between pulley 54 of conveyor end portion 32 and pulley 76 of conveyor part 22.

At the same time that conveyor end portion 32 is being cleared, the uppermost surfaces 136 of the rake 130 form a bridge between pulleys 46 and the T-shaped member 98 to support the books coming from the binder 12 on the upstream portion 30 of the conveyor 20. The articles so supported are thus in place ready to move when the conveyor end portion 32 returns to its horizontal position. This enables a continuing or continuous flow of articles in the primary path from the binder 12 to the stacker 14, even while the conveyor end portion 32 of the conveyor 20 is in an inclined position and moving toward its horizontal position. Thus, the rake 130 has one part 134 that clears conveyor end portion 32 and one part 136 that fills the gap 150 (FIG. 4) created along the primary path by the absence of the conveyor end portion 32.

Once the conveyor end portion 32 is cleared of all books by the action of rake 130 and while the rake is supporting the books in the gap 150, the air cylinder 120 is extended to pivot the conveyor end portion 32 to its upper, horizontal position. When the conveyor end portion 32 is in its upper, horizontal position, the belts 64 are slightly above the bridging parts 136 of the rake members 130 as shown in FIG. 5. Therefore, moving the conveyor end portion 132 to its upper position lifts the books 16 from the bridging parts 136 and re-establishes the primary path from the binder 12 to the stacker 14.

After the primary path of books is re-established, the air cylinder 144 is retracted to pivot the rake members 130 counterclockwise to the position illustrated in FIG. 3. Because the conveyor end portion 32 in its upper position conveys the books 16 above the bridging legs 136 of the rake 130, the V-shaped members 132 are retracted in a direction opposite to that of the movement of the books 16 without affecting the movement of the books on the conveyor 20.

The gate mechanism 10 is able to handle, convey, and push articles even when they are composed of flexible sheets. The pushing by legs 134 and bridging or supporting by legs 136 is especially desirable when articles being conveyed are flexible sheets of paper, whether single sheets, signatures, booklets, or books. Such articles are flexible and cannot be pushed for a great distance without conveyor belt support. When making the shift back to conveying articles along the primary path to the stacker 14 but while the conveyor end portion 32 is still in its lower, inclined position (FIG. 5) conveyor belt 64 push the books 14 or articles over legs 136 bridging the gap 150 with the aligned conveyor 22. Legs 136 support the articles in the gap 150 for sufficient time to permit the conveyor section 32 to return to its normal running condition aligned with conveyor 22.

What is claimed is:

1. An apparatus for conveying a shingled stream of articles, said apparatus comprising an infeed conveyor having a fixed portion and a pivotal portion, means for shifting said pivotal portion between a first position in which the stream of articles travels along a first path and a second position in which the stream of articles travels along a second path, means for clearing articles off said pivotal portion of said infeed conveyor and for supporting articles for movement along said first path prior to return of said pivotal portion from said second position to said first position, and an outfeed conveyor, said pivotal portion of said infeed conveyor being aligned with said outfeed conveyor when in said first position and said pivotal portion being spaced from said outfeed conveyor when said pivotal portion is in said second position thereby creating a gap between said fixed portion of said infeed conveyor and said outfeed conveyor when said pivotal portion is in said second position, said means for clearing articles off said pivotal portion including a part for spanning said gap.

2. An apparatus as set forth in claim 1 wherein said infeed conveyor includes a plurality of spaced conveyor belts and said means for clearing articles includes a plurality of members movable into the spaces between adjacent belts.

3. An apparatus as set forth in claim 1 wherein said means for clearing articles includes a member having a first surface for engaging the articles on said pivotal portion of said infeed conveyor and a second surface transverse to said first surface for spanning said gap to thereby support articles along said first path.

4. An apparatus as set forth in claim 3 further including means for moving said member between a first position in which said first surface is free of contact with said articles and said secod surface is spaced from said gap and a second position in which said second surface spans said gap, said first surface engaging the articles on said pivotal conveyor section and clearing said pivotal conveyor section of articles as said member moves from said first position toward said second position.

5. An apparatus as set forth in claim 4 wherein said infeed conveyor includes a plurality of spaced conveyor belts and said member includes a plurality of tines and said means for moving said member includes means for moving said tines in the spaces between said conveyor belts.

6. An apparatus as set forth in claim 5 wherein said belts of said infeed conveyor when said infeed conveyor is in said first position are above said second surface of said member when said member is in said gap-spanning second position.

7. An apparatus for conveying a shingled stream of articles, said apparatus comprising an infeed conveyor having a fixed portion and a pivotal portion, means for shifting said pivotal portion between a first position in which the stream of articles travels along a first path and a second position in which the stream of articles travels along a second path, and means for clearing articles off said pivotal portion of said infeed conveyor and for supporting articles for movement along said first path prior to return of said pivotal portion from said second position to said first position, said means for clearing articles including a movable member having a first surface means for engaging the articles on said pivotal portion of said infeed conveyor when said pivotal portion is in said second position and for pushing them off said pivotal portion, and a second surface means transverse to said first surface means for supporting articles along said first path as said pivotal portion of said infeed conveyor moves from said second position to said first position.

* * * * *